US010688424B2

(12) United States Patent
Siegert et al.

(10) Patent No.: US 10,688,424 B2
(45) Date of Patent: Jun. 23, 2020

(54) LIQUID STORAGE AND FILTRATION METHOD

(71) Applicant: Pure Gravity Filtration Systems, LLC, Conroe, TX (US)

(72) Inventors: Brendan S. Siegert, Conroe, TX (US); Lee L. Reneau, Conroe, TX (US)

(73) Assignee: Pure Gravity Filtration Systems, LLC, Conroe, TX (US)

( * ) Notice: Subject to any disclaimer, the term of this patent is extended or adjusted under 35 U.S.C. 154(b) by 154 days.

(21) Appl. No.: 16/037,646

(22) Filed: Jul. 17, 2018

(65) Prior Publication Data

US 2018/0318741 A1    Nov. 8, 2018

Related U.S. Application Data

(62) Division of application No. 15/287,766, filed on Oct. 7, 2016, now abandoned.

(51) Int. Cl.
| | | |
|---|---|---|
| *C11B 3/10* | (2006.01) |
| *C11B 3/00* | (2006.01) |
| *B01D 39/14* | (2006.01) |
| *B01D 39/16* | (2006.01) |

(52) U.S. Cl.
CPC ......... *B01D 39/14* (2013.01); *B01D 39/1623* (2013.01); *C11B 3/008* (2013.01); *C11B 3/10* (2013.01); *B01D 2239/0457* (2013.01)

(58) Field of Classification Search
None
See application file for complete search history.

(56) References Cited

U.S. PATENT DOCUMENTS

| | | |
|---|---|---|
| 103,592 A | 5/1870 | Farson |
| 321,877 A | 7/1885 | Abell |
| 421,777 A | 2/1890 | Stanton |
| 425,400 A | 4/1890 | Boles |
| 444,013 A | 1/1891 | Paddock |
| 466,809 A | 1/1892 | Stone |
| 498,967 A | 6/1893 | Benham |
| 651,948 A | 6/1900 | Lawson |
| 943,512 A | 12/1909 | Blanke |
| 967,905 A | 8/1910 | Flagg |
| 1,641,051 A | 8/1927 | Rheney |
| 1,698,600 A | 1/1929 | McMachen |
| 1,834,045 A | 12/1931 | Breuil |
| 1,948,771 A | 2/1934 | Rucker |
| 2,026,867 A | 1/1936 | Compton |
| 2,083,632 A | 6/1937 | Beck |
| 2,216,407 A | 10/1940 | Bradford |
| 2,247,040 A | 6/1941 | Whitsett |

(Continued)

OTHER PUBLICATIONS

USPTO Non-Final Office Action for U.S. Appl. No. 15/287,766 dated Oct. 5, 2017.

(Continued)

*Primary Examiner* — Robert J Popovics
(74) *Attorney, Agent, or Firm* — Tumey L.L.P.

(57) ABSTRACT

A method for using a filtration system is provided. The filtration system can include a container, an inner cup, and a filter pad. The filtration system can be configured to remove undesirable impurities from liquid. For example, the filtration system can be configured to remove total polar molecules and lovibond color red from used cooking oil.

1 Claim, 5 Drawing Sheets

(56) References Cited

U.S. PATENT DOCUMENTS

| | | | | |
|---|---|---|---|---|
| 2,450,520 | A | 10/1948 | Maddux | |
| 2,865,511 | A | 12/1958 | Hopkins, Jr. | |
| 3,140,799 | A | 7/1964 | Walter | |
| 3,231,390 | A * | 1/1966 | Hoover | C11B 3/10 426/417 |
| 3,797,378 | A | 3/1974 | Morris | |
| 3,849,309 | A | 11/1974 | Morris | |
| 3,849,312 | A | 11/1974 | Wecker | |
| 4,149,454 | A | 4/1979 | Kemp | |
| 4,283,283 | A | 8/1981 | Zimmerman | |
| 4,328,097 | A * | 5/1982 | Whaley | B01D 29/41 210/167.28 |
| 4,485,831 | A | 12/1984 | Ungerleider | |
| 4,555,339 | A | 11/1985 | Graves | |
| 4,604,203 | A | 8/1986 | Kyle | |
| 4,739,697 | A | 4/1988 | Roberts | |
| 4,749,481 | A | 6/1988 | Wheatley | |
| 4,764,274 | A | 8/1988 | Miller | |
| 4,930,906 | A | 6/1990 | Hemphill | |
| 4,948,499 | A | 8/1990 | Peranio | |
| 4,968,518 | A * | 11/1990 | Lopez | A23D 9/04 210/DIG. 8 |
| 4,988,440 | A * | 1/1991 | Bernard | A47J 37/1223 210/504 |
| 5,076,922 | A | 12/1991 | Deare | |
| D323,874 | S | 2/1992 | Hirman et al. | |
| 5,318,703 | A | 6/1994 | Heiligman | |
| 5,322,196 | A | 6/1994 | Burton | |
| 5,348,755 | A * | 9/1994 | Roy | A23D 9/06 210/504 |
| 5,411,661 | A | 5/1995 | Heiligman | |
| 5,567,461 | A | 10/1996 | Lehrer | |
| 5,597,600 | A * | 1/1997 | Munson | C11B 3/10 426/330.6 |
| 5,601,715 | A | 2/1997 | Middleton et al. | |
| 5,637,214 | A | 6/1997 | Kahana | |
| 5,652,008 | A | 7/1997 | Heiligman | |
| 5,832,810 | A | 11/1998 | Brawley et al. | |
| RE36,516 | E | 1/2000 | Lehrer | |
| 6,010,558 | A | 1/2000 | Ackland | |
| 6,109,487 | A | 8/2000 | Hashimoto | |
| 6,126,018 | A | 10/2000 | Cone | |
| 6,187,355 | B1 * | 2/2001 | Akoh | B01D 15/00 106/38.3 |
| 6,227,405 | B1 | 5/2001 | Andreoli | |
| 6,355,168 | B1 | 3/2002 | White | |
| 6,368,648 | B1 * | 4/2002 | Bertram | C11B 3/008 210/DIG. 8 |
| 6,387,260 | B1 | 5/2002 | Pimenov et al. | |
| 6,394,313 | B1 | 5/2002 | Wesley | |
| 6,524,477 | B1 | 2/2003 | Hughes | |
| 6,793,092 | B1 | 9/2004 | Hayakawa et al. | |
| 6,841,067 | B1 | 1/2005 | Hofmann et al. | |
| 6,911,150 | B2 | 6/2005 | Churchman et al. | |
| 6,953,523 | B2 | 10/2005 | Vandenbelt et al. | |
| 6,960,295 | B2 | 11/2005 | Chaouachi et al. | |
| 7,008,537 | B2 | 3/2006 | Koslow | |
| 7,137,419 | B1 | 11/2006 | Reeves | |
| 7,438,799 | B2 | 10/2008 | Vandenbelt et al. | |
| 7,670,479 | B2 | 3/2010 | Arett et al. | |
| 7,708,958 | B2 | 5/2010 | Namespetra et al. | |
| 8,016,150 | B1 | 9/2011 | Bunch | |
| 8,043,502 | B2 | 10/2011 | Nauta | |
| 8,128,820 | B2 | 3/2012 | Wu | |
| 8,177,966 | B2 | 5/2012 | Wu | |
| 8,216,465 | B2 | 7/2012 | Nauta | |
| 8,567,456 | B1 * | 10/2013 | Francis | B67C 11/02 141/286 |
| D721,533 | S | 1/2015 | Coco | |
| 8,980,351 | B2 * | 3/2015 | Ulahanan | C11B 3/008 426/330.6 |
| 9,192,265 | B1 | 11/2015 | Johnson | |
| 9,820,618 | B1 | 11/2017 | Fiedler | |
| 10,493,389 | B2 * | 12/2019 | Siegert | B01D 39/1623 |
| 2001/0032822 | A1 | 10/2001 | Koslow et al. | |
| 2002/0066698 | A1 | 6/2002 | Brunner | |
| 2004/0031539 | A1 | 2/2004 | Goodwin | |
| 2004/0045905 | A1 | 3/2004 | Churchman et al. | |
| 2004/0060873 | A1 | 4/2004 | Yanou et al. | |
| 2006/0162806 | A1 | 7/2006 | Hengsperger et al. | |
| 2006/0191824 | A1 | 8/2006 | Arett | |
| 2006/0204621 | A1 | 9/2006 | Piepenbrink | |
| 2006/0226064 | A1 | 10/2006 | Beckman | |
| 2007/0209984 | A1 | 9/2007 | Lev | |
| 2008/0035582 | A1 | 2/2008 | Moretto | |
| 2009/0317023 | A1 | 12/2009 | Baker | |
| 2011/0189361 | A1 | 8/2011 | Rao | |
| 2018/0098664 | A1 | 4/2018 | Siegert | |
| 2018/0099238 | A1 | 4/2018 | Siegert | |
| 2018/0318741 | A1 | 11/2018 | Siegert | |
| 2018/0361286 | A1 | 12/2018 | Siegert | |

OTHER PUBLICATIONS

USPTO Final Office Action for U.S. Appl. No. 15/287,766 dated May 31, 2018.

USPTO Notice of Abandonment for U.S. Appl. No. 15/287,766 dated Dec. 11, 2018.

USPTO Non-Final Office Action for U.S. Appl. No. 16/115,334 dated Jan. 7, 2019.

USPTO Notice of Allowance for U.S. Appl. No. 16/115,334 dated Jul. 31, 2019.

USPTO Office Action for U.S. Appl. No. 15/287,766 dated Oct. 5, 2017.

USPTO Office Action for U.S. Appl. No. 16/115,334 dated Jan. 7, 2019.

* cited by examiner

LIQUID STORAGE AND FILTRATION METHOD

CROSS-REFERENCE TO RELATED APPLICATIONS

This application is a divisional application of U.S. patent application Ser. No. 15/287,766 filed Oct. 7, 2016 the entire contents of which is incorporated herein by reference thereto.

BACKGROUND OF THE INVENTION

Field of the Invention

This invention relates to filtration systems and, more particularly, to an apparatus and method for removing unwanted contaminates from cooking oil. The utilization of cooking oil on a repetitive basis results in an accumulation of Total Polar Molecules (herein, "TPMs") in the oil. Over a period of time—depending upon several factors, including: the quantity of cooking oil, the moisture content of processed food, and the quantity of food processed therein—the TPMs accumulate until the TPMs produce undesirable characteristics in the food prepared in the oil. These adverse characteristics are usually in the form of the discoloration of the oil, foul odors, excess grease in the food, and an unpalatable taste of the food being fried.

Replacing 100% of the used oil with new oil is neither economically nor environmentally satisfactory. The filtration system disclosed herein provides an apparatus which will efficiently remove the polar molecules from the oil and restore color so that the oil may be reused many times in accordance with regularity of its being filtered with this apparatus.

Background of the Invention

Systems have been developed for filtering cooking oil and extending the life of the oil for cooking purposes, however each system contains fundamental flaws in method, design and composition. These systems include pressurized systems and each of these systems is inadequate in terms of color and overall microfiltration/treatment of the oil. These units lack the ability to restore color and remove contaminants to a level that is appropriate for continued use of the oil.

Accordingly, a need exists for a filtration system that effectively treats the oil and removes contaminants (e.g., TPMs) from the cooking oil and allows the oil to be safely reused without sacrificing the quality of food.

BRIEF SUMMARY OF SOME OF THE PREFERRED EMBODIMENTS

From the moment cooking oil is manufactured, it begins to deteriorate due to exposure to environmental components including oxygen, heat, water, and light. When heated, oil starts to form unwanted components such as aldehydes and ketones, diener, acids, and higher peroxide and anisidine values. Failure to protect cooking oil from these chemical changes or failure to remove these unwanted components can result in the degradation of color and the formation of chemical chains eventually resulting in the cooking oil becoming rancid. Specifically, it is the hydrolysis and/or autoxidation of fats into short-chain aldehydes and ketones that result in the depreciation of color and are objectionable in taste and odor. As a result of such exposure, the cooking oil begins to break down and form Free Fatty Acids and oxidative substances known as aldehydes and ketones. Cooking oil that becomes rancid has a rank, unpleasant smell or taste, and is undesirable for cooking or consumption.

The filtration system described herein provides a system for removal of these unwanted impurities in used cooking oil. The filtration system can include one or more filtration stages for the purpose of removing unwanted contaminates from used cooking oil. The filtration system can include pouring used cooking oil into a top portion of a container. The used oil can then be passed through a particulate filter to provide a particulate-lean oil. The particulate-lean oil can then be passed through a filter pad to produce a filtered oil, which is collected in a lower portion of the container. Removal of these contaminates allows a user to continuously use and filter the cooking oil.

The filtration system can include a container and a lid configured to affix to, or otherwise fit thereon. An inner cup unit can include a particulate filter, a filter expander, an inner cup, a filter pad, a compression ring, or any combination thereof. A lower chamber of the container can collect filtered cooking oil until the user is ready to remove the filtered oil from the container. To remove the filtered oil, the user can open the pour spout lid and tip the container so that the filtered oil stored in the lower chamber travels through the pour channel and out of the pour spout.

A key benefit of this filtration system is the environmental impact that will result from its use. According to a 1998 study by the National Renewable Energy Laboratory, about 9 pounds of used cooking oil are generated per person per year. According to an article published in 2014 by National Geographic (Eating Water Up: The Water "Footprint" of Food), 25,682 gallons of water per capita per year is required to meet the demand for Soybean Oil. With the current U.S. population of about 325 million people, that converts to just over 8 trillion gallons of water per year required to make this oil for the U.S. alone. This filtration system is capable of allowing the reuse of up to 85% of cooking oil, which translates to the potential to conserve nearly 7 trillion gallons of water, enough to provide enough water for New York City for over 19 years. The particular embodiment described herein houses a 2 quart design and is capable of conserving 2,240 gallons of water per use.

In addition to the water conservation benefits this filtration system provides, the filtration system can assist in preventing the coagulation of city sewer systems. The Wall Street Journal reported that at least 75% of the nation's sewage pipelines are operating at less than 50% capacity due to the problems arising from Fats, Oils and Greases being improperly disposed of and into city pipelines. When used as intended, this filtration system is capable of reusing the oil many times, significantly reducing the rate and quantity of oil being discarded.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

A design and method for using a filtration system is provided. The filtration system can include a container, an inner cup, a filter pad, where the filter pad can be configured to remove undesirable impurities from liquid. The filtration system can include one or more filtration stages for the purpose of removing unwanted contaminates from used cooking oil. The filtration system can include pouring used cooking oil into a top portion of a container. The used oil can then be passed through a particulate filter to provide a particulate-lean oil. The particulate-lean oil can then be passed through a filter pad to produce a filtered oil, which is collected in a lower portion of the container. The filtration system can be made up of one or more components, which can be assembled and disassembled according to the user's desires. For example, the components of the filtration system can be assembled for filtering used cooking oil and then disassembled for cleaning. The filtration system can also be disassembled to replace filters and other components.

"Cooking oil" can include any type of oil used for cooking. This includes oils typically used for frying foods. For example, cooking oil can include peanut oil, vegetable oil, canola oil, sunflower oil, safflower oil, sesame oil, corn oil, avocado oil, mustard oil, palm oil, rice bran oil, semi-final filtered sesame oil, and semi-final filtered sunflower oil. Cooking oil can also include, but is not limited to, olive oil, palm oil, soybean oil, canola oil (rapeseed oil), and other vegetable oils.

Figure 1:
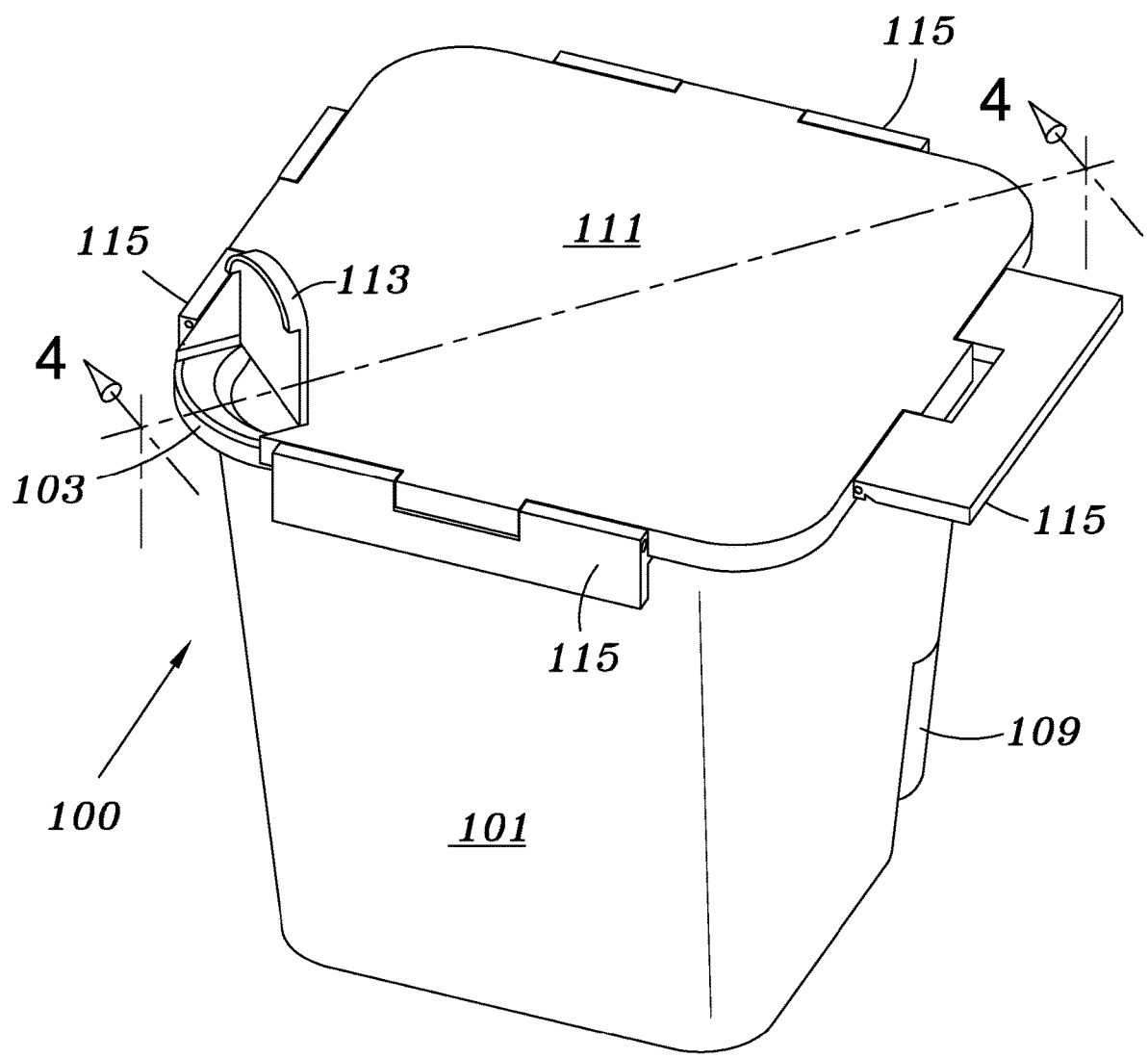
FIG. 1 depicts side view of a filtration system, according to one or more embodiments described.

FIG. 1 depicts a filtration system 100 including a container 101 and a lid 111. The container 101 can include pour spout 103 and/or a handle 109. The container 101 can have an elongated shape (e.g., rectangular prism, square, etc.). The container 101 can have three or more sides, four or more sides (as shown), five or more sides, six or more sides, seven or more sides, eight or more sides, nine or more sides, or ten or more sides. The container 101 can include an indention along the sides of the inner cup 140 or indention/hole on side of the container 101 to allow room for an air hole. The container 101 can have a bottom and a top. The top of the container 101 can be open about the top where one or more lids 111 can be disposed about the top of the container to "close" or "seal" the container 101. The lid 111 can include a pour spout lid 113 and/or one or more latches 115. The lid 111 can have three or more sides, four or more sides (as shown), five or more sides, six or more sides, seven or more sides, eight or more sides, nine or more sides, or ten or more sides. In one or more embodiments, the lid's sides can be referred to as the lid's "edges". In one or more embodiments, a lip can extend downward from the lid's one or more edges.

The one or more latches 115 can be configured to attach the lid 111 to the container 101. In one or more embodiments, the one or more latches 115 can be connected to the lid 111 along one or more of the lid's edges. In one or more embodiments, one or more latches 115 can be connected to one edge of the lid 111, one or more latches 115 can be connected to two or more edges of the lid 111, one or more latches 115 can be connected to three or more edges of the lid 111, one or more latches 115 can be connected to four or more edges of the lid 111, or one or more latches 115 can be connected to five or more edges of the lid 111.

The one or more latches 115 can be connected to the lid via a hinge configuration such that the latch 115 can rotate about its connection point. The latches 115 can be configured to connect the lid 111 to the container 101. The latches 115 can be configured to fold down over a top lip of the container 101 and "snap" into a locked position. A "locked position" can be any position where the lid 111 is attached or otherwise connected to the container 101 so as to reasonably secure any contents placed therein. In one or more embodiments, the lid 111 can be configured to attach to the container 101 by any means reasonably considered by one skilled in the art. For example, the lid 111 can be attached to the container 101 via threaded attachment, via "snap" attachment, via compression attachment, etc.

The pour spout lid 113 can extend from or otherwise be connected to the lid 111. The pour spout lid 113 can be configured to cover the pour spout 103 of the container 101. The pour spout lid 113 can be connected to the lid 111 via a hinge configuration, where the pour spout lid 113 can be lifted or removed (uncovering the pour spout 103) without removing the entire lid 111 from the container 101. The pour spout lid 113 can be moved and/or locked into an "open" position by a hinge configured to lock into place. In one or more embodiments, the pour spout lid 113 can be separate from the lid 111, and can be configured to connect to the container 101 with a separate locking mechanism. The pour spout lid 113 can be configured to connect to the top rim of the container 101 at or about the pour spout 103 by any means reasonably considered by one skilled in the art or any attachment means described herein.

Figure 2:
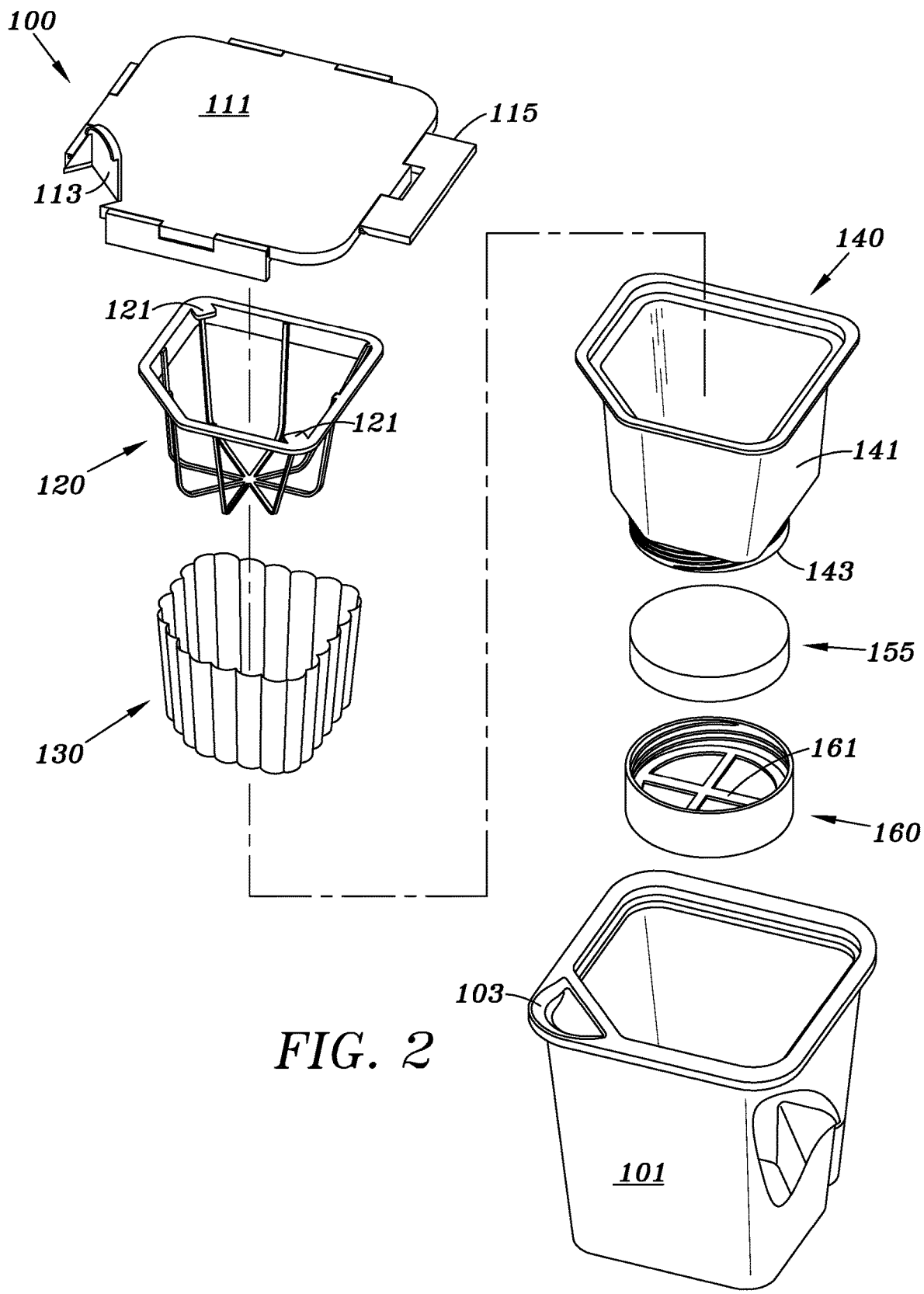
FIG. 2 depicts a side view of a disassembled filtration system, according one or more embodiments described.

FIG. 2 depicts a disassembled filtration system 100, showing the possible components of the filtration system 100 and how some or all of those components interact to form the filtration system 100. FIG. 2 shows these components in a disassembled state but the reader should understand that the filtration system 100 can be assembled by placing one or more of the components together in an order similar to the one shown in FIG. 2. The filtration system 100 can include one or more lids 111, one or more filter expanders 120, one or more particulate filters 130, one or more inner cups 140, one or more filter pads 155, and one or more compression rings 160, one or more containers 101, or any combination thereof. The one or more lids 111 and/or one or more containers 101 can be as described above in reference to FIG. 1.

The filter expander 120 can be configured to fit inside the container 101 and can include one or more lift tabs 121. The lift tabs 121 can provide a means for a user to easily remove the filter expander 120 from the container 101 during assembly and disassembly. The filter expander 120 can be configured to provide structural support to the particulate filter 130. The filter expander 120 can provide structural support to the particulate filter 130 by being made of a stiff or hard material and/or having a similar shape and size to the particulate filter 130. The filter expander 120 can have a top portion that is similar in size and shape to the top rim of the container 101. In one or more embodiments, the filter expander 120 can be left out completely.

The particulate filter 130 can include a filter (e.g., filter paper) configured to remove solids from the used cooking oil to produce the particulate-lean oil. Particulates can be described as suspended solids within the liquid over about 50 microns in diameter. The general purpose of the particulate filter 130 is to remove large and unwanted contaminates from the used cooking oil to prevent clogging of downstream filters. The particulate filter 130 can include a coffee filter type paper, a screen, meshed material, or other material configured to remove solid particulates from oil while allowing the oil to pass through. The particulate filter 130 can cover the bottom of the inner cup 140 and can have side walls that extend up the sides of the inner cup 140. The side walls of the inner cup can form a variety of shapes, including but not limited to a conical shape. For example, the sidewalls of the particulate filter 130 can extend up the entire wall of the inner cup 140. In some embodiments, the particulate filter 130 can be left out of the filtration system 100. The particulate filter 130 can remove about 40% of the particulates to about 100% of the particulates from the used cooking oil. The particulate filter 130 can remove about 50% of the particulates to about 100% of the particulates, or about 70% of the particulates to about 100% of the particulates, or about 80% of the particulates to about 100% of the particulates from the used cooking oil. The particulate filter 130 can remove about 90% of the particulates to about 100% of the particulates, or about 92% of the particulates to about 99% of the particulates, or about 95% of the particulates to about 98% of the particulates from the used cooking oil.

The inner cup 140 can be configured to house the filter expander 120 and/or the particulate filter 130. The inner cup 140 can be configured to fit inside the container 101 such that the inner cup 140 divides the internal volume of the container 101 into an upper portion (also "upper chamber") and a lower portion (also "lower chamber"). To accomplish this, a top rim of the inner cup 140 can be configured to rest on a top rim of the container 101. The inner cup 140 can be angled. In most embodiments, the inner cup 140 can rest on the top rim of the container 101 such that the lid 111 can still be secured to the container 101. The inner cup 140 can be configured to hold a volume of liquid (e.g., cooking oil) and/or direct that liquid to a filter pad 155 placed at or near the bottom of the inner cup 140. A hole can be placed between the inner cup 140 and the container 101 that allows for air flow throughout the container 101 (e.g., air flow between the upper and lower chambers).

The inner cup 140 can include a main body 141 and a connector 143. The inner cup 140 can be configured to direct used cooking oil through the particulate filter 130 and/or the filter pad 155. As shown in FIG. 2, the compression ring 160 can be configured to secure the filter pad 155 to the base of the inner cup 140 by attaching the compression ring 160 to the connector 143. The compression ring 160 can connect to the inner cup 140 by a variety of connection methods, e.g., threadably connected by axial rotation.

The compression ring 160 can include a screen 161, and the screen 161 can be used to prevent the filter pad 155 from slipping through the compression ring 160 as well as provide the filter pad 155 with structural support without inhibiting the flow of cooking oil through the filtration system 100.

Figure 3:
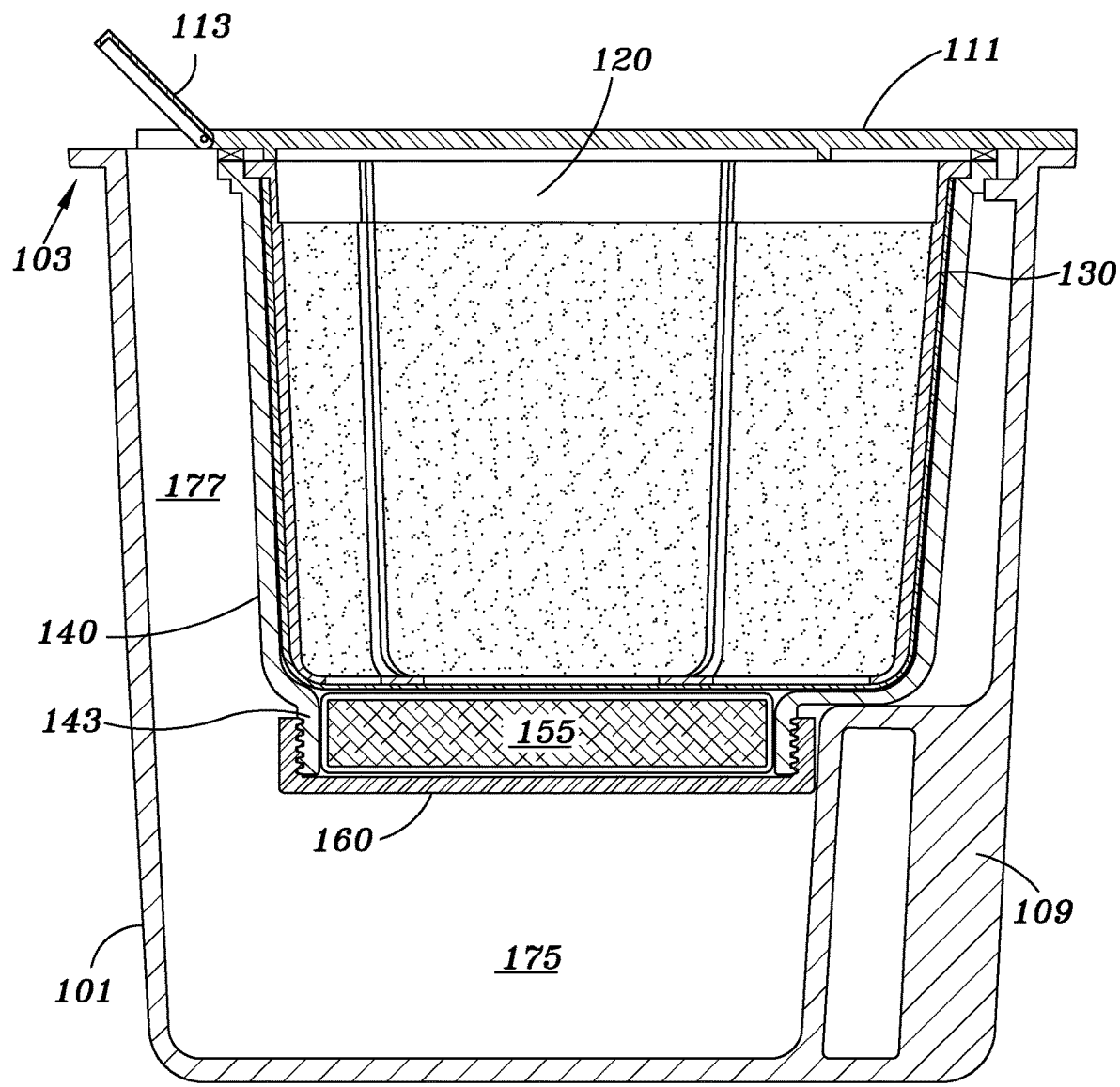
FIG. 3 depicts a cross-sectional view of an assembled filtration system, according to one or more embodiments.

FIG. 3 depicts an assembled filtration system 100 according to one or more embodiments described herein. When assembled, the filtration system 100 can include the lid 111, the container 101, the particulate filter 130, the filter expander 120, the filter pad 155, the compression ring 160, the inner cup 140, a gasket 117, or any combination thereof. The particulate filter 130 and/or the filter expander 120 can be placed inside the inner cup 140. As shown, the filter expander 120 can be placed inside the particulate filter 130. In an alternative embodiment, the particulate filter 130 can be placed inside the filter expander 120. During assembly, an inner cup unit can include the inner cup 140 having one or more of the following contained therein or attached thereto: the particulate filter 130, the filter expander 120, the filter pad 155, and/or the compression ring 160. This inner cup unit can then be placed inside the container 101. In one or more embodiments, the inner cup unit can rest on a ridge disposed on the inner wall of the container 101. For example, a ridge can be created on the inner wall of the container 101 by the handle 109, and the inner cup unit can rest on that ridge.

The inner cup 140 can be placed inside the container 101 so that the top rim of the inner cup 140 rests near or at the top rim of the container 101. In at least one embodiment, the inner cup 140 can be positioned in a top portion of the internal volume of the container 101, thereby creating a lower portion of the internal volume of the container 101 (herein, "lower chamber" 175). Dividing the internal volume of the container 101 into two or more portions helps to separate the unfiltered or particulate-lean oil from the filtered oil.

To filter used cooking oil, a user may assemble the filtration system 100 except for the lid 111. Used oil can then be poured into the inner cup 140 portion of the filtration system 100 and gravity may be used to direct the oil through the remainder of the filtration system 100. In one or more alternative embodiments, air pressure or other means may be used to direct the oil through the filtration system 100. The used oil will flow through the filter expander 120 and particulate filter 130 to provide the particulate-lean oil. The particulate-lean oil can then flow through the filter pad 155 and, if present, the compression ring 160 to provide the filtered oil. The filtered oil can be collected in a lower chamber 175. In one or more embodiments, the user may elect to disregard the filter pad 155 and only use the particulate filter 130 to achieve only the particulate-lean oil.

The filtered oil can be kept in the lower chamber until it is needed for cooking, at which time the user may pour the filtered oil through the pour spout 103. To pour out the filtered oil, the user may open the pour spout lid 113 and tilt the container 101 so that the oil is directed through a pour channel 177 and out of the pour spout 103. The lid 113 and inner cup 140 can be positioned alternately to change the location of the pour channel 177, at user's convenience. In one or more embodiments, the user may grab the container's handle 109 to more easily pour the filtered oil.

Figure 4:
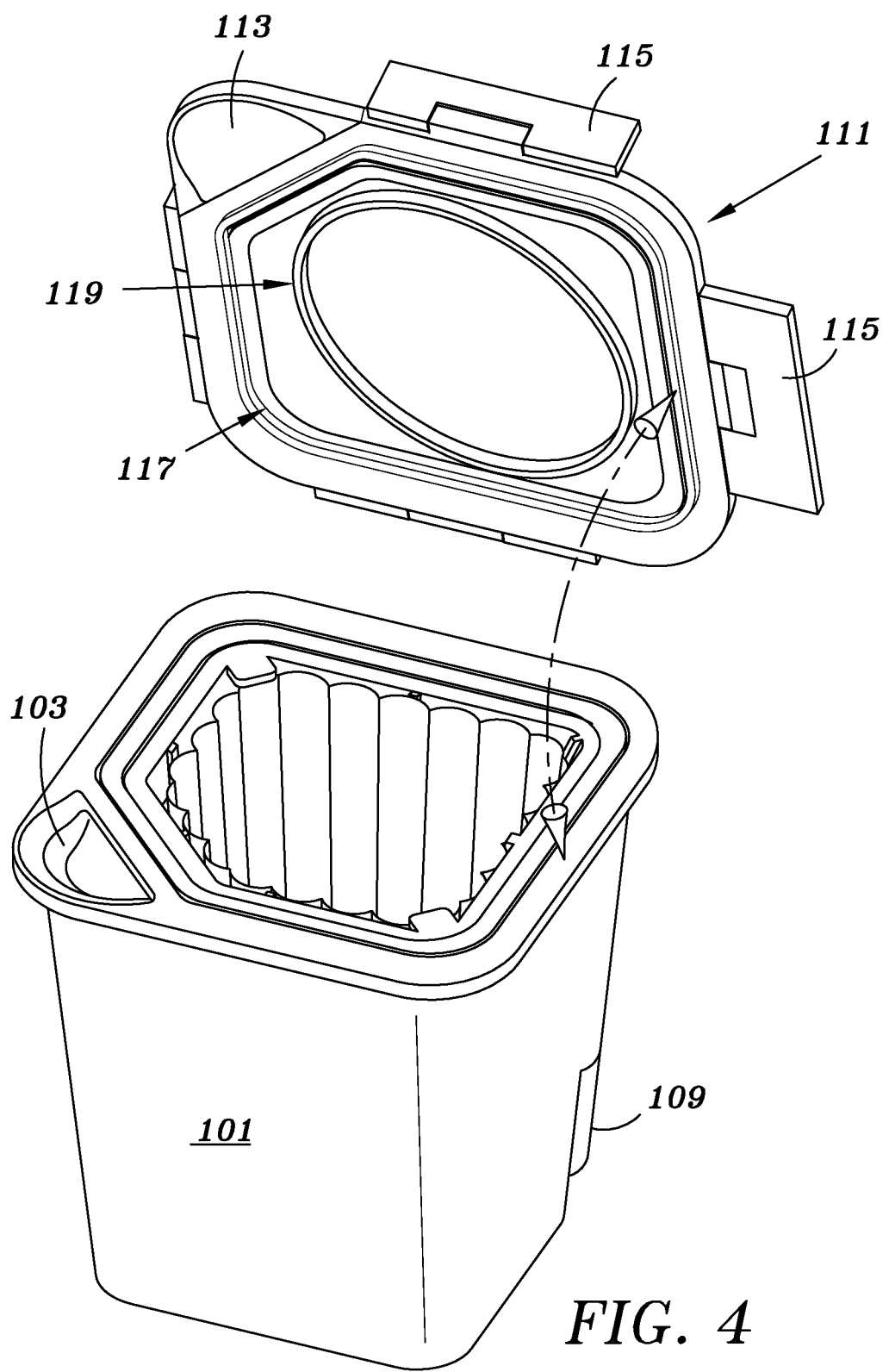
FIG. 4 depicts a side view of a filtration system, according to one or more embodiments.

A benefit provided by this filtration system is the ability to pour filtered oil from the container 100 without spilling or contaminating the filtered oil with any used, unfiltered oil located in the inner cup 140. As shown in FIG. 4, this can be accomplished by a special design of the lid 111. The lid 111 can include one or more internal ridges 119 and/or one or more gaskets 117. The one or more internal ridges can be ridges raised from the underside of the lid 111. The gasket 117 can be utilized in one or more embodiment to ensure the separation of the upper and lower chambers of the container 101. In one or more embodiment, the gasket 117 can be placed on the lid (as shown), and can include one or more ridges raised from the underside of the lid. In one or more alternative embodiments, the gasket can be placed on the inner cup 140, the container 101 or the filter expander. The gasket 117 can have a similar shape and size to the inner cup 140. The gasket 117 can be any material used and known to someone skilled in the art, including, but not limited to, FDA approved material such as silicone, nitrile (buna), EPDM and Neoprene. In one or more embodiments the gasket can be replaced with a ridge and built into the design of the container 101 or inner cup 140 to effectively separate the upper and lower filter chambers from one another.

A benefit provided by this filtration system is the ability to pour filtered oil from the container 100 without spilling or contaminating the filtered oil with any used, unfiltered oil located in the inner cup 140. As shown in FIG. 4, this can be accomplished by a special design of the lid 111. The lid 111 can include one or more internal ridges 119 and/or one or more gaskets 117. The one or more internal ridges can be ridges raised from the underside of the lid 111. The gasket 117 can be utilized in one or more embodiment to ensure the separation of the upper and lower chambers of the container 101. In one or more embodiment, the gasket 117 can be placed on the lid (as shown), and can include one or more ridges raised from the underside of the lid. In one or more alternative embodiments, the gasket can be placed on the inner cup 140, the container 101 or the filter expander. The gasket 117 can have a similar shape and size to the inner cup 140. The gasket 117 can be any material used and known to someone skilled in the art, including, but not limited to, FDA approved material such as silicone, nitrile (buna), EPDM and Neoprene. In one or more embodiments the gasket can be replaced with a ridge and built into the design of the container 101 or inner cup 140 to effectively separate the upper and lower filter chambers from one another.

The gasket 117 can be configured to have a shape and size similar to the shape and size of the top rim of the inner cup 140. When the lid 111 is placed on the container 101, the gasket 117 will "seal off" the contents of the inner cup 140. Then, the user can open the pour spout lid 113 and pour out the filtered oil from the lower volume 175 of the container 101 without any of the oil in the inner cup 140 escaping the container 101 and/or the interior of the inner cup 140.

Figure 5:
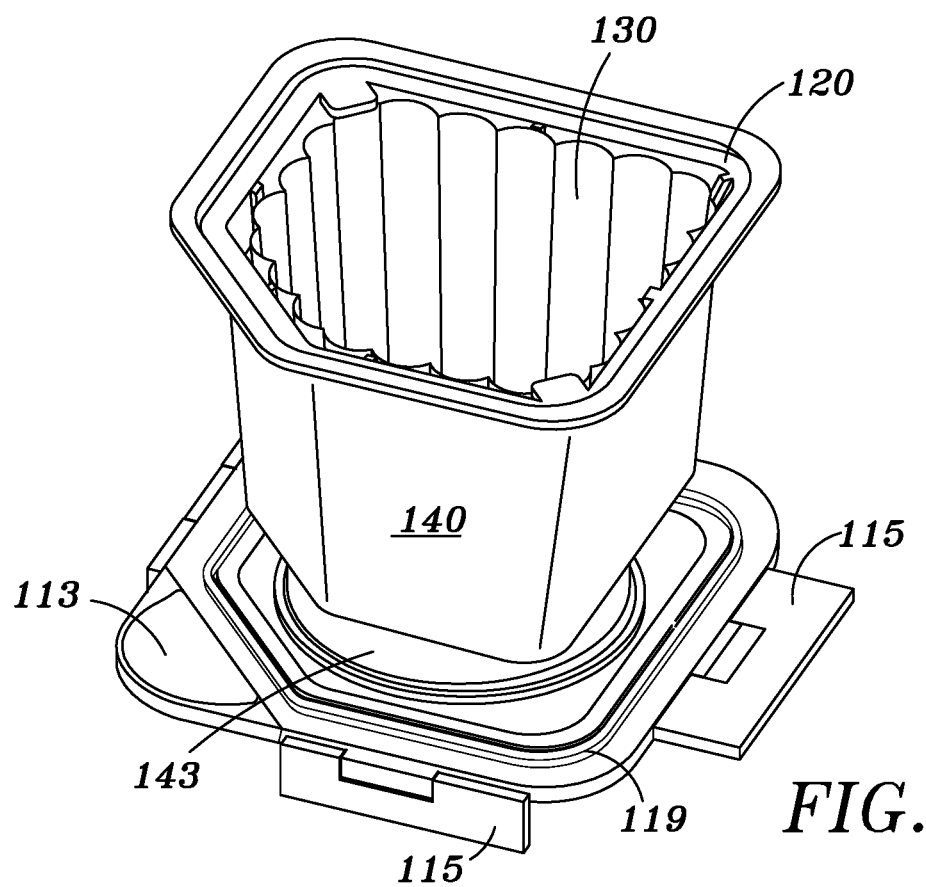
FIG. 5 depicts a side view of an inner cup unit placed on a lid, according to one or more embodiments described.

An additional benefit of this filtration system is the ability to operate the filtration system 100 without creating a mess on the countertop or any surface on which the filtration system is being used. As shown in FIG. 5, the lid 111 can be removed from the container 101 and placed up-side-down on the countertop. Then, the inner cup 140 and its connector 143, filter pad 155, the compression ring 160, or any combination thereof can be removed from the container 101 and placed on the lid 111 within the internal ridge 119. The internal ridge 119 can act to hold the inner cup 140 in place while collecting any residual oil from the inner cup 140. This will keep the inner cup 140 in place and/or keep the residual oil from spilling onto the countertop.

Another benefit of this filtration system is the ability to use the filtered oil many times over. Depending on the type of food being cooked with the cooking oil (e.g., frying chicken tenders, frying vegetables, etc.), the cooking oil can be filtered and reused. As the cooking oil is used to cook food, the food will absorb and remove about 15-20% of the cooking oil in most residential applications. When this happens, a user can replace the absorbed cooking oil with new cooking oil. This can occur with each use, with the user replacing the cooking oil absorbed by the food with new, unused cooking oil.

For example, 5 cups of cooking oil can be used to fry chicken tenders. As the chicken cooks, it may absorb 1 cup of cooking oil. The user can filter the remaining 4 cups of cooking oil through the filtration system and add 1 cup of new cooking oil to provide a second batch of cooking oil. The second batch of cooking oil can be used to fry a second batch of chicken tenders. As the second batch of chicken cooks, it may absorb 1 cup of the second batch of cooking oil. The user can filter the remaining 4 cups of the second batch of cooking oil and add 1 cup of new cooking oil to provide a third batch of cooking oil, and so on. With each batch of cooking oil, the food will naturally absorb some of the oil, and that amount of oil can be replaced with new cooking oil. With the effectiveness of the filtration system, the filter pad, and replacing the absorbed cooking oil with new oil, the cooking oil can be used significantly longer, as it will remain in good condition for cooking, as defined by its level of contaminates described herein. In many circumstances, recycled or reused cooking oil is preferred to new cooking oil.

In one or more embodiments, the filtration system 100 can be configured to filter a batch of oil in the time frame of 8-24 hours. This slow filtration process can allow the oil to contact the filtration medium for a desired length of time. A benefit of this is that the batch of oil will be filtered and ready for use the next day, which is particularly beneficial if the user intends to fry consecutive days.

Figure 6:
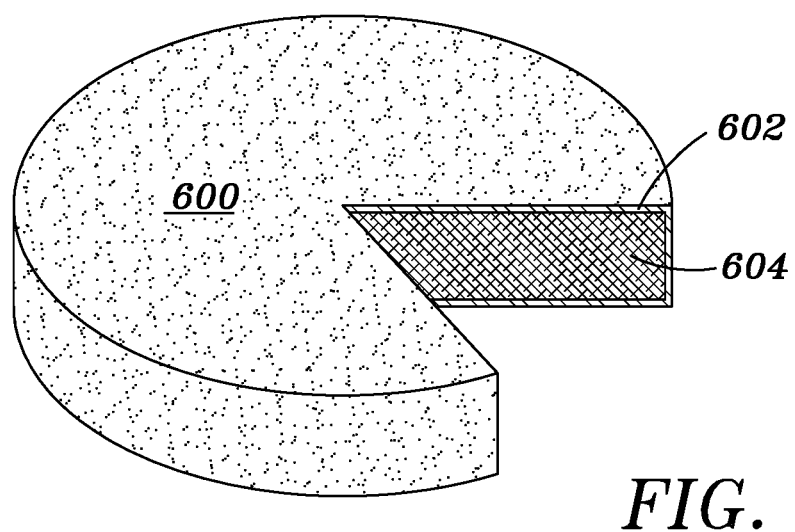
FIG. 6 depicts a side view of a filter pad, according to one or more embodiments described.

FIG. 6 depicts a side view of a filter pad 600. The filter pad 600 can be the same or similar to the filter pad 155 discussed and described above in reference to FIGS. 1 through 5. Though the filter pad is shown here to be a circular disc, the filter pad can be modified in shape and composition to accomplish the filtering needs of the particular application. Many variables can affect the overall success of the filter, and, therefore, the filter can be modified in light of those variables in order to perform to the user's desires. For example, the filtration system may be increased in size (e.g., volume capacity) which can require a larger filter pad. In some circumstances, the liquid being filtered may be of a different viscosity, and may require a different compression density of the filter pad (e.g. the filter pad can be altered in composition and density and be used as a water filter). In one or more embodiments, the filter pad 600 can include 100% FDA compliant material. In one or more embodiments, the filter pad 600 can include a handle, which may serve to make the filter pad 600 more easily handled. The filter pad 600 can also include a flange or extension which may be used to secure the filter pad 600 into a preselected position. The filter pad 600 can be replaced with other filter media or filter device to achieve desired results (e.g., the filter pad 600 can be replaced with a device to allow the filter to act as a strainer, allowing water and other liquids to be used as potential applications).

The filter pad 600 can be composed of one or more layers, two or more layers, three or more layers, four or more layers, or five or more layers. As shown, the filter pad 600 can include two layers: an inner layer 604 and an outer layer 602. The outer layer 602 can include a filter paper, meshed material, or other material configured to allow oil to flow through the outer layer 602 and the inner layer 604 of the filter pad 600. The outer layer 602 can include a filter paper made, at least partially, of a Rayon-based filter paper. The inner layer 604 can include a filter composite, and can be referred to herein as a "filter composite" or "filter medium".

In one or more embodiment the outer layer 602 can be composed of a rayon-based filter paper having a weight of about 1.50 ounces per square yard (OSY). The outer layer 602 can have an air permeability of 425 CFM (Frazier number). The outer layer 602 can have a typical value of 5 CD and 20 MD dry tensile strength measured by lbs./3". The outer layer 602 can be composed of any filter type paper, a screen, meshed material, or other material configured to remove solid particulates from oil while allowing the oil to pass through.

The filter pad 600 can include a fibrous material and carbon. The filter pad can include carbon, cellulose, polyester, and rayon. For example, the filter pad can include a blend comprising about 7 to about 9 grams of filter paper, about 6 to about 8 grams of rayon, about 3 to about 5 grams of polyester, and about 12 to about 16 grams of carbon. The carbon can include powdered activated carbon (e.g., BG-HHM), which can be a liquid phase powdered activated carbon (PAC). The carbon can include granular carbon and/or activated granular carbon. The filter pad 600 can consist of an outer layer of fibrous material containing an inner layer of PAC or granular carbon. The carbon can also be an acid-activated, wood based product and may be capable of adsorbing high and low molecular weight organic impurities. The carbon can have a minimum Iodine Number of about 700 mg/g, and/or a moister of about 10 weight percent (herein, "wt. %"), and/or and ash value of about 6.0 wt. %. The carbon can have a value less than 200 US Mesh (0.075 mm) of about 90 wt. %. The carbon can have a value less than 325 US Mesh (0.045 mm) of about 60 wt. % to about 85 wt. %. The filter pad 600 can exclude carbon to form a dense micro-filter for less dense liquid applications such as water.

The rayon can be qualified as "regular tenacity". The rayon can have a denier per filament (DPF) of about 0.8. The rayon can have a length of about ⅛ inch. The polyester can be qualified as "high tenacity". The polyester can have a denier per filament (DPF) of around 3. The polyester can have a length of about ⅛". The polyester can be qualified as "low shrink".

The filter pad can also include a cellulose composition. The cellulose composition can have a weight of about 7.3 ounces per square yard (oz./sq. yd.). The cellulose composition can have a thickness of about 40 mills. The cellulose composition can have a Frazier Permeability of about 11.7 cfm/ft2. The cellulose composition can have a MD tensile strength of about 26 lbs. The cellulose composition can have a wet burst of about 120". The cellulose composition can have a micron rating of about 22.

The filter pad can be configured of material, and amount thereof, specifically selected to control the flow rate of the used cooking oil, or other liquid, through the filter pad. This flow rate can directly or indirectly effect the contact time used cooking oil has with the filter medium. Contact time is important, as it allows the filter medium to remove undesirable contaminates from the used cooking oil. In at least one embodiment, the wide range in flow rate can be due to the reliance of gravity as the only pressure source in this embodiment. The pressure, and thus the flow rate, can be determined by the amount of oil currently in the inner cup 140. The initial flow rate can be substantially faster than the final flow rate due to pressure, specific weight of the fluid, and clogging of the filter pad by contaminates.

The flow rate of used cooking oil through the filter pad can be at the rate (herein, "filter flow rate") measured in (milliliters per hour) per (square centimeter), which is abbreviated herein as "ml/hr./cm$^2$". The filter pad can have an initial filter flow rate, which is the filter flow rate of the filter pad the first time it is used (e.g., a brand new filter pad) and a final filter flow rate the last time it is used (e.g., the last time the filter pad is used before needing to be replaced). As the filter pad is used, more of the openings are obstructed, therefore slowing the filter flow rate for each subsequent use.

The initial filter flow rate through the filter pad can be from about 1.00 ml/hr./cm2, about 1.10 ml/hr./cm2, about 1.25 ml/hr./cm2, about 1.35 ml/hr./cm2, or about 1.40 ml/hr./cm2 to about 1.45 ml/hr./cm2, about 1.50 ml/hr./cm2, about 1.55 ml/hr./cm2, about 1.70 ml/hr./cm2, or about 1.85 ml/hr./cm2. In one or more embodiments, the initial flow rate of through the filter pad can be about 1.5 ml/hr./cm2, about 2.5 ml/hr./cm2, about 3.5 ml/hr./cm2, or about 4.5 ml/hr./cm2, to about 5.5 ml/hr./cm2, about 6.5 ml/hr./cm2, about 7.5 ml/hr./cm2, about 8.5 ml/hr./cm2, about 9.5 ml/hr./cm2, or about 10.5 ml/hr./cm2.

The final filter flow rate through the filter pad can be from about 0.25 ml/hr./cm2, about 0.35 ml/hr./cm2, about 0.45 ml/hr./cm2, or about 0.55 ml/hr./cm2 to about 0.65 ml/hr./cm2, about 0.70 ml/hr./cm2, about 0.75 ml/hr./cm2, about 0.85 ml/hr./cm2, or about 0.10 ml/hr./cm2. In one or more embodiments, the final flow rate of through the filter pad can be about 0.5 ml/hr./cm2, about 1.5 ml/hr./cm2, about 2.5 ml/hr./cm2, about 3.5 ml/hr./cm2, or about 4.5 ml/hr./cm2, to about 5.5 ml/hr./cm2, about 6.5 ml/hr./cm2, about 7.5 ml/hr./cm2, about 8.5 ml/hr./cm2, or about 9.5 ml/hr./cm2.

The average filter flow rate through the filter pad can be about 0.65 ml/hr./cm2, about 0.75 ml/hr./cm2, about 0.85 ml/hr./cm2, about 0.95 ml/hr./cm2 to about 1.05 ml/hr./cm2, about 1.15 ml/hr./cm2, about 1.25 ml/hr./cm2, about 1.35 ml/hr./cm2, about 1.45 ml/hr./cm2, or about 1.55 ml/hr./cm2. In one or more embodiments, the initial flow rate of through the filter pad can be about 0.05 ml/hr./cm2, about 0.5 ml/hr./cm2, about 2 ml/hr./cm2, about 3 ml/hr./cm2, or about 4 ml/hr./cm2, to about 5 ml/hr./cm2, about 6 ml/hr./cm2, about 7 ml/hr./cm2, about 8 ml/hr./cm2, about 9 ml/hr./cm2, about 10 ml/hr./cm2, or about 11 ml/hr./cm2.

The filter pad 600 can be configured to have a variety of shapes and sizes, which can each be modified to accomplish a desirable flow rate. In one or more embodiments, the thickness of the filter pad can be selected to accomplish desired filtration. For example, the filter pad 600 can have a thickness of about 0.125 inches to about 2.0 inches, about 0.15 inches to about 1.5 inches, or about 0.3 inches to about 1.3 inches. The filter pad 600 can have a thickness of about 0.125 inches, about 0.25 inches, about 0.5 inches, about 0.75 inches, about 1.0 inch, about 1.25 inches, about 1.50 inches, about 1.75 inches, about 2.0 inches, about 2.5 inches, about 3.0 inches, about 3.0 inches, about 3.5 inches, about 4.0 inches, about 4.5 inches, or about 5 inches. In some embodiments, the filter pad can be greater than 5.0 inches thick.

In one or more embodiments, the filter pad 600 can be generally circular in shape and have a diameter between 1.0 inch and 2.0 feet. For example, the filter pad 600 can have a diameter of about 1.0 inch, about 1.5 inches, about 1.75 inches, about 2.0 inches, about 2.5 inches, about 3.5 inches, about 4.0 inches, about 4.5 inches, or about 5.0 inches. For example, the filter pad 600 can have a diameter of about 6.0 inches, about 7.0 inches, about 8.0 inches, about 9.0 inches, about 10 inches, about 12 inches, about 15 inches, about 18 inches, or about 24 inches. In one or more embodiments, the filter pad can have a diameter of greater than 24 inches.

The filter medium can include carbon (e.g., Calgon BGHHM grade), fibrous material, polyester, rayon, or any combination thereof Fibrous materials can include any material derived or made from plants. Fibrous materials can include textiles, non-wovens, composite materials, or any combination thereof Fibrous material can include, but is not limited to, Aramid Fiber, Chipboard, Corrugated board, Felt, Fiberglass, Graphite, Kevlar, Masonite, or Cellulose.

The filter medium can include (by weight percent, "wt. %") about 1.0 wt. % fibrous material, about 5.0 wt. % fibrous material, about 10 wt. % fibrous material, about 15 wt. % fibrous material, about 20 wt. % fibrous material, about 25 wt. % fibrous material, about 30 wt. % fibrous material, about 35 wt. % fibrous material, about 40 wt. % fibrous material, about 45 wt. % fibrous material, about 50 wt. % fibrous material, about 55 wt. % fibrous material, about 60 wt. % fibrous material, about 65% wt. % fibrous material, about 70 wt. % fibrous material, about 75 wt % fibrous material, about 80 wt. % fibrous material, about 85 wt. % fibrous material, 90 wt. % fibrous material, about 95 wt. % fibrous material, or about 99 wt. % fibrous material. In one or more embodiments, the filter medium can include about 1.0 wt. % carbon, about 5.0 wt. % carbon, about 10 wt. % carbon, about 15 wt. % carbon, about 20 wt. % carbon, about 25 wt. % carbon, about 30 wt. % carbon, about 35 wt. % carbon, about 40 wt. % carbon, about 45 wt. % carbon, about 50 wt. % carbon, about 55 wt. % carbon, about 60 wt. % carbon, about 65 wt. % carbon, about 65 wt. % carbon, about 70 wt. % carbon, about 75 wt. % carbon, about 80 wt. % carbon, about 85 wt. % carbon, about 90 wt. % carbon, about 95 wt. % carbon, or about 99 wt. % carbon.

In one or more embodiments, the filter medium can include about 1.0 wt. % polyester, about 5.0 wt. % polyester, about 20 wt. % polyester, about 30 wt. % polyester, about 40 wt. % polyester, or about 50 wt. % polyester. In one or more embodiments, the filter medium can include about 5.0 wt. % rayon, about 20 wt. % rayon, about 30 wt. % rayon, about 40 wt. % rayon, about 50 wt. % rayon, about 60 wt. % rayon, or about 70 wt. % rayon.

The filter pad can reduce the amount of undesirable components found in used cooking oil. These undesirable components can include (1) moisture, insoluble impurities, and unsaponifiable matter (collectively, "MIll"); (2) total polar molecules ("TPM"); (3) free fatty acids ("FFA"); (4) peroxide value ("PV"); and (5) anisidine value ("AV"). The used oil can be filtered through the filter pad to provide a filtered oil having significantly reduced concentration of these undesirable components. For example, the filter pad can remove more that 50% of the total TPMs from the used oil. The filter pad can remove Mills from the used oil. For example, the filter pad can remove from about 25%, about 35%, about 45%, or about 55% to about 65%, about 75%, about 85%, or about 95% of the Mills from the used oil. The filtered oil can have an Mill concentration of about 0.25 wt. %, about 0.50 wt. %, about 0.75 wt. %, or about 1 wt. % to about 1.5 wt. %, about 1.25 wt. %, about 1.5 wt. %, about 2.0 wt. %, about 2.5 wt. %, about 3.0 wt. %, or about 3.5 wt. %.

The filter pad can remove FFAs from the used oil. For example, the filter pad can remove from about 0.05%, about 1.0%, about 10%, about 15%, about 25%, or about 35% to about 45%, about 55%, about 65%, or about 75% of the FFAs from the used oil. The filtered oil can have an FFA concentration of about 0.05 wt. %, about 0.10 wt. %, about 0.20 wt. %, about 0.30 wt. %, or about 0.50 wt. % to about 0.75 wt. %, about 1 wt. %, about 1.5 wt. %, about 2.0 wt. %, about 2.5 wt. %, about 3.0 wt. %, about 4.0 wt. %, or about 5.0 wt. %.

The filter pad can reduce the PV value of the used oil. For example, the filter pad can reduce the PV value by about 20%, about 30%, about 40%, about 50%, about 55%, about 60%, about 65%, about 70%, about 80%, or about 90%. The filtered oil can have a PV value of about 1.0 milliequivalents (1 milliequvaluent=peroxide oxygen per 1 kilogram of fat or oil, commonly known in the industry), about 3.0 milliequivalents, about 5.0 milliequivalents, about 6.0 milliequivalents, about 7.0 milliequivalents, about 8.0 milliequivalents, or about 9.0 milliequivalents to about 10 milliequivalents, about 12 milliequivalents, about 14 milliequivalents, about 16 milliequivalents, about 18 milliequivalents, about 20 milliequivalents, about 22 milliequivalents, about 24 milliequivalents, about 26 milliequivalents, or about 28 milliequivalents.

The filter pad can reduce the AV value of the used oil. For example, the filter pad can reduce the AV value by about 5%, about 10%, about 15%, about 18%, about 25%, about 35%, about 45%, or about 50%. The filtered oil can have an AV value of 2.0, about 10.0, about 15.0, about 20.0, or about 25.0 to about 30.0, or about 35.0.

In one or more embodiments, the filter pad can remove more that 10% of the TPMs from the used oil. In one or more embodiments, the filter pad can remove more than 20% of the TPMs from the used oil. In one or more embodiments, the filter pad can remove more that 30% of the TPMs from the used oil. In one or more embodiments, the filter pad can remove more that 40% of the TPMs from the used oil. In one or more embodiments, the filter pad can remove more than 50% of the TPMs from the used oil. In one or more embodiments, the filter pad can remove more than 60% of the TPMs from the used oil. In one or more embodiments, the filter pad can remove more than 70% of the TPMs from the used oil. The filtered oil can have a TPM concentration of about 5.0 wt. % (weight percent), about 7.5 wt. %, about 10 wt. %, about 15 wt. %, or about 20 wt. %. The filtered oil can have a TPM concentration of about 4.0 wt. % (weight percent), about 8.0 wt. %, or about 11.0 wt. % to about 16.0 wt. %, about 18.0 wt. %, or about 21 wt. %.

The filter pad can also remove the amount of Lovibond color red from the used oil and/or the particulate-lean oil. For example, the filter pad can remove more than 25% of the Lovibond color red from the used oil and/or the particulate-lean oil. In one or more embodiments, the filter pad can remove more than 40% of the Lovibond color red from the used oil and/or the particulate-lean oil. In one or more embodiments, the filter pad can remove more than 50% of the Lovibond color red from the used oil and/or the particulate-lean oil. In one or more embodiments, the filter pad can remove more than 70% of the Lovibond color red from the used oil and/or the particulate-lean oil. In one or more embodiments, the filter pad can remove more than 90% of the Lovibond color red from the used oil and/or the particulate-lean oil. The filtered oil can have a Lovibond color red value of about 0.05, about 0.5, about 1.0, about 2.0, or about 2.5 to about 4.0, about 5.0, about 6.0, about 7.5, or about 10.

Test

The filtration system (sometimes referred to herein as "Pure Gravity filtration system") was tested against an existing product produced by Tasuka Corporation (herein referred to as the "Tasuka filtration system").

Over the course of two days, twenty-eight and a half pounds (28.5 lbs.) of battered meat and vegetables were deep fried in oil at, or about, 350 degrees Fahrenheit (° F.). The used oil was then filtered through a pre-filter (Rockline Industries coffee filter—rated at about 100 microns) to remove heavy solids to provide a particulate filtered used oil. Then, a sample of the particulate filtered used oil was filtered through the Pure Gravity filtration system, and a second sample of the particulate filtered used oil was filtered through the Tasuka filtration system. A third sample of the particulate filtered used oil was used as the control. A sample was taken from each of these filtered oils and the following characteristics were measured: (1) Lovibond-color: red, yellow (as shown in Table 2); (2) moisture, insoluble impurities, and unsaponifiable matter (collectively, "MIU"); (3) total polar molecules ("TPM"); (4) free fatty acids ("FFA"); peroxide value ("PV"); and (5) anisidine value ("AV") (as shown in Table 1). The color was measured according to the Lovibond standard using American Oil Chemist Society's ("AOCS") method Cc 13b-45. The MIU value was measured according to AOCS methods Ca 2d-25, Ca3a-46, Ca 6a-40, and Cd 12b-92. TPM content was measured by column chromatography using the AOCS method Cd 20-91.

The FFA content was measured using AOCS method 5a-40. The PV was measured using AOCS method Cd 8-53. The AV was measured using an automated Food lab Touch instrument.

TABLE 1

|  | TPM (wt. | FFA (wt. | PV (milliequivalents) | AV | MIU (wt. |
|---|---|---|---|---|---|
| Used oil (control) | 21.50 | 0.36 | 14.0 | 18.96 | 0.53 |
| Tasuka | 11.20 | 0.32 | 6.2 | 19.85 | 0.56 |
| Pure Gravity | 9.62 | 0.28 | 4.8 | 15.90 | 0.50 |
| New, unfiltered oil | 1.50 | 0.05 | 0.6 | 0.85 |  |

TABLE 2

|  | Lovibond - Yellow | Lovibod - Red |
|---|---|---|
| Used oil | 70 - yellow | 7.0 - red |
| Tasuka | 38 - yellow | 4.7 - red |
| Pure Gravity | 11 - yellow | 1.7 - red |

As shown in Table 1, the Pure Gravity Filter provided a filtered used oil having less TPMs, less FFAs, lower PV value, and lower AV value than the Tasuka filter system and the particulate filtered control. As shown, the Tasuka filtration system reduced the TPM concentration from 21.50 to 11.20. The Pure Gravity filtration system, however, reduced the TPM concentration from 21.50 to 9.62.

As shown in Table 2, the filtration of the used cooking oil through the Pure Gravity filter pad improves Lovibond color results exceedingly compared to the Tasuka filtration system. As shown in Table 2, the Tasuka filtration system reduced the Lovibond color yellow from 70-yellow to 38-yellow. However, the Pure Gravity filtration system reduced the Lovibond color yellow from 70-yellow to 11-yellow. Similarly, the Pure Gravity filtration system removed far more Lovibond color red from the used oil that the Tasuka filtration system. As shown in Table 2, the Tasuka filtration system reduced the Lovibond color red from 7.0-red to 4.7-red, and the Pure Gravity filtration system reduced the Lovibond color red from 7.0-red to 1.7-red.

The most notable difference between the Pure Gravity filter system and the Tasuka filter system is the color. For most households and commercial businesses, color is the determining factor of when to discard used cooking oil. It is also believed to be the most critical factor in taste and color of the food being fried. The Pure Gravity filter system removed more than double the Lovibond color "red", a 76% removal compared to the 36% removal demonstrated by the Tasuka filter system. See Table 2.

Independent of the comparison the Tasuka filter system and the coffee filters, the Pure Gravity filter system restored the used oil to its "sweet spot" (typically in the range of 9 to 12 TPM), making the oil more desirable for repeated use.

Certain embodiments and features have been described using a set of numerical upper limits and a set of numerical lower limits. It should be appreciated that ranges including the Combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present filtration system, other and further embodiments of the filtration system may be devised without departing from the basic scope thereof, and the scope thereof is determined by the claims that follow.

What is claimed is:

1. A method of gravity filtering used cooking oil comprising the steps of:
   pouring used cooking oil into a filtration system including a particulate filter and a filter pad including carbon and having an initial filter flow rate of about 1.0 ml/hr./cm$^2$ to about 10.5 ml/hr./cm$^2$, said filtration system being capable of removing impurities to the following levels: a total polar molecule concentration of about 4.0 to about 14.0 percent by weight; a free fatty acid concentration of about 0.05 to about 4.0 percent by weight; a peroxide value concentration of about 1.0 to about 10.0 milliequivalents; and a Lovibond color red value of about 0.5 to about 4.0; said pad being situated beneath said particulate filter; and
   allowing the used cooking oil, which has been poured into the filtration system to pass through the particulate filter and the filter pad by gravity, thereby producing a filtered used cooking oil.

* * * * *